Nov. 12, 1963   L. D. BOSTICK   3,110,478
FISH TAPE
Filed Aug. 1, 1960

INVENTOR.
LOUIS D. BOSTICK
BY
ATTORNEYS

United States Patent Office 3,110,478
Patented Nov. 12, 1963

3,110,478
FISH TAPE
Louis D. Bostick, 16343 Ludlow, Granada Hills, Calif.
Filed Aug. 1, 1960, Ser. No. 46,587
6 Claims. (Cl. 254—134.3)

This invention relates to fish tapes and more particularly to an improved fish tape assembly for use in the installation of electrical conductors in protective tubing.

Many proposals have been made for fishing tape constructions having as their purpose meeting the exacting and widely varying needs encountered in the use of such tapes. As is well known, fishing tapes must have sufficient longitudinal strength as to permit the transmission of both tension and compressive loads, yet sufficiently flexible and resilient as to deflect to bypass obstacles and in particular to follow the tortuous passages commonly encountered in electrical tubing installations.

Recent designs have sought to satisfy these needs by providing a fish tape with a relatively stiffly flexible main body fitted at its end with a flexible leader. One of the more satisfactory types of such constructions employs the leader formed from a closely wound helical coil of spring wire provided at its forward end with a round-nosed fitting coupled to the end of the main body of the tape by a flexible tension cable passing through the wire coil. The closely wound helical coil is required to carry no load since this is carried by the internal tension cable, the function of the helical coil being to provide longitudinal stiffness coupled with live flexibility. This construction offers very definite advantages over other fish tape constructions but nevertheless is subject to certain serious disadvantages successfully overcome by the present invention. For example, the desired flexibility and resistance to permanent deformation of the leader is obtainable only through use of a relatively large diameter spring wire coil having a minimum diameter at least two or three times that of the main body of the fishing tape. The excessive diameter of the leader seriously limits the number of conductors which can be installed within a conduit and greatly increases the work involved in forcing the fishing tape along the conduit, particularly when partially filled with conductors. It is especially difficult to feed the fish wire forward into the tube under partially filled conditions of the tube.

Other disadvantages include the fact that the turns of the wire coil type leader are apt to engage and hang up against sharp-edged obstructions along the conduit, as, for example, where the leader is traversing a junction box or couplings spaced along the conduit. Furthermore, it is found that in use portions of the spring tip leader tend to become deformed either by opening the gap between adjacent convolutions or by the lateral displacement of adjacent turns. These deformations of the coil provide opportunity for the engagement of the coil turns with internal obstacles along the conduit and to the further deformation of the coil as attempts are made to manipulate the tape along the conduit.

The specially designed leader constituting an important feature of the present invention avoids these numerous disadvantages and others characteristic of prior art constructions. The leader comprises a high-strength core formed of a large number of hard drawn spring steel wires compactly twisted together and protected on their exterior by a single serving of wide thin strip material the convolutions of which are closely spaced but wound oppositely to the individual wires of the core cable. The exterior serving of this smooth-surfaced wide strip material has numerous functions. For example, it greatly increases the general rigidity of the leader while permitting it to deflect as necessary to traverse a particular length of the conduit system or to bypass an obstacle while constantly tending to resume its normal straight condition. The serving also holds the core wires compactly together and prevents any possibility of the individual wires separating from one another. Additionally, the strip serving protects the core wires against abrasion and wear.

The close spacing between the individual convolutions of the serving provides the space necessary for sharp bending of the leader while leaving insufficient space between the convolutions to engage sharp corners or obstructions along the conduit. The very thin nature of the high-strength strip material is also of importance since it prevents sufficient penetration of an obstruction between convolutions of the serving strip to provide a serious hang-up against an internal obstruction within the conduit system. Moreover, the very smooth substantially continuous surface provided by the closely spaced turns of the strip provides a leader having very low surface friction thereby greatly facilitating its passage through the conduit in either direction. Opposite ends of the protective serving are firmly anchored to the core cable ends by suitable smooth-surfaced fittings one of which also forms an anchorage for the turn bend loop formed in the tip end of the leader cable and through which the electrical conductor to be installed may be attached.

Accordingly, it is a primary object of the present invention to provide fishing tape assembly having greatly improved characteristics over prior constructions.

Another object of the invention is the provision of a fishing tape assembly featuring a novel leader at its forward end of unusual flexibility yet one having extremely high resistance to permanent deformation.

Another object of the invention is the provision of an improved fishing tape assembly having a leader highly resistant to permanent deformation and an overall diameter approximating that of the main body of the fishing tape.

Another object of the invention is the provision of a fishing tape having a highly flexible leader at its forward end including a high-strength flexible core cable closely embraced by a flat strip serving pitched oppositely to the twist of the core cable components.

These and other more specific objects will appear upon reading the following specification and claims and upon considering in connection therewith the attached drawing to which they relate.

Referring now to the drawings in which a preferred embodiment of the invention is illustrated.

Figure 1:
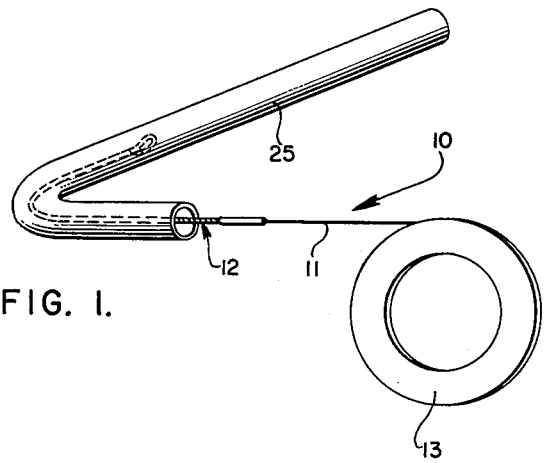
FIGURE 1 is a fragmentary perspective view of a fishing tape incorporating the present invention mounted on a suitable reel and in the process of being fed into the near end of protective tubing for electrical conductors.
Figure 2:
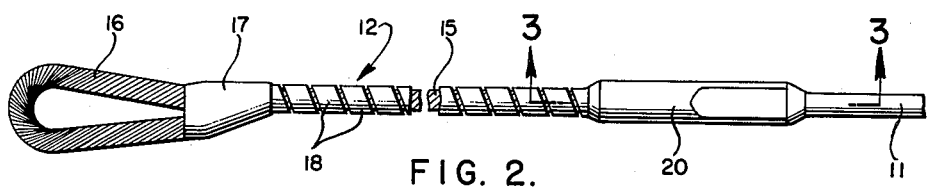
FIGURE 2 is a fragmentary view on enlarged scale of the forward end of the fish tape assembly.

Referring more particularly to FIGURES 1 and 2, there is shown a fishing tape according to the present invention and designated generally 10. Tape 10 comprises two principal parts including an elongated main body 11 of any desired length and a leader 12 attached to its forward end in any suitable manner. Main body tape 11 is here shown as coiled within a handling reel 13 of any suitable construction as, for example, that shown in the patent of Charles C. Hormel, No. 1,890,945. This type of reel has an annular main body of stamped sheet metal and is provided with a continuous annular slit about its outer peripheral rim formed to have a frictional grip with the fishing tape thereby preventing the tape from uncoiling unintentionally. It is pointed out that a reel is not necessary and that its use is a matter of personal preference. As here shown, all except the foremost end of the main body 11 of the tape is coiled within reel 13.

Attached to the forward end of main body 11 is a core 15 of compactly-arranged helically twisted fine wires of high strength and of extremely springy material. By virtue of these properties, leader core 15 is readily flexible and deflectable but always tends to resume its normal straight form and is highly resistant to permanent deformation, as is the main body 11 of the fishing tape. The foremost end of the leader cable is preferably formed with a return bend loop 16 and this is firmly anchored to the base of the loop by the smoothly-contoured anchorage sleeve 17.

Tightly surrounding the main body of leader core 15 is a helical serving of polished thin strip material 18. Strip 18 is preferably formed of very springy abrasion and corrosion-resistant material as, for example, stainless steel. Of importance is the fact that serving 18 is wound in the opposite direction to the twist of the wires in core 15 and with an axial gap 19 between adjacent convolutions sufficient to permit free and sharp flexing of the leader but not so large as to permit the sharp edges of a junction box or of a conduit end to enter the gap and cause "hang up" of the leader. This objective is also materially aided by the thinness of tape 18 which is preferably in the range of 3 to 8 mils. It will, therefore, be appreciated that the thickness of serving 18 is insufficient to afford the entry of a junction box corner or burr or the like in an amount supporting more than momentary hang-up readily dislodged by slight rotary or irregular movement imparted from the operator end of the fishing tape.

Figure 3:
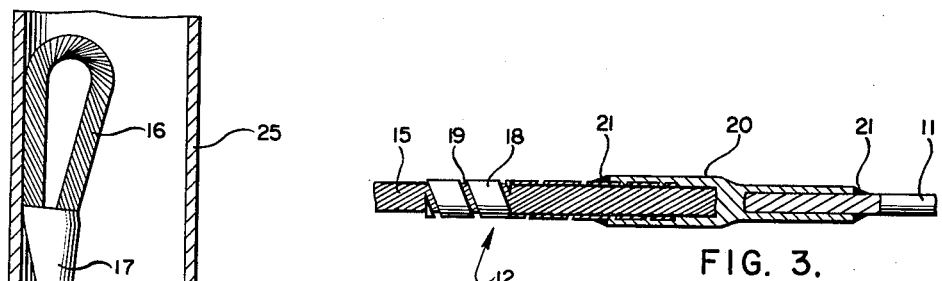
FIGURE 3 is a fragmentary cross-sectional view taken along line 3—3 on FIGURE 2.

The means for coupling the trailing end of leader 12 to main body 11 of the fishing tape may take various forms such as a loose-fitting limited universal connection. Preferably, however, a non-swivelling coupling connection is employed, such as that shown in detail in FIGURE 3. This coupling comprises a tubular sleeve 20 telescopically seating leader 12 in one end and main body 11 of the fishing tape in the other end. The sleeve is rigidly anchored to tape 11 and leader 12 by mechanically crushing the sleeve against these parts, by brazing or soldering the parts together, or by a combination of these expedients. It will also be understood that, if desired, the forward end of the tape 11 may be notched along its edges and that coupling sleeve 20 may be swaged into these notches. Regardless of the method employed for attaching the parts together, the opposite ends of sleeve 20 are preferably tapered or wiped with solder 21 to avoid possibility of hang-up as well as of injury to insulation of conductors already present in a conduit.

Figure 4:
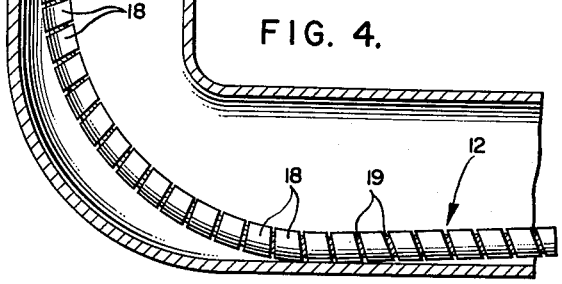
FIGURE 4 is an enlarged fragmentary view partly in section showing the leader in the process of being fed forwardly along a sharp tubing bend.

In the use of the described fishing tape, it will be understood that the tape is employed in the customary manner. Normally, the main body of the fishing tape would be held reeled or coiled as the leader on its forward end is fed into the entrance end of tubing or a conduit 25 indicated only fragmentarily in FIGURES 1 and 4. It will be understood that conduit 25 is normally installed in a building structure and usually includes numerous branch-offs and junction boxes along its length which offer impediment to the passage of the fishing tape.

The operator grasps the main body of the tape closely adjacent the entrance end of the conduit while feeding it forwardly into the conduit. As leader 12 advances into turns, curves, junction fittings, and the like, along the interior of the tubing, the curved forward end of loop 16 provides a pilot effective in deflecting the flexible leader past these obstructions as it is advanced along the conduit. In this manner, the leader is deflected around sharp bends and past obstructions of all characters including other electrical conductors which may be present in the conduit. Once the fishing tape has been pushed into the conduit to a junction with a conductor to be installed, the end of such conductor is passed through loop 16 and suitably anchored thereto, whereupon the operator grasps the other end of the fishing tape and pulls the entire assembly backwardly through the conduit along with the attached conductor.

As will be readily understood from the foregoing, the highly flexible leader 12 will deflect easily and into any shape or position required to follow the interior of the conduit system or to bypass obstructions therein. Since leader 12 is preferably only 12 to 18 inches in length, it will be understood that it offers considerable power transmitting strength axially of the leader yet is freely flexible laterally to provide a pilot for guiding the forward end of the main body of tape 11 past obstructions. It is also pointed out that the main body 11 is preferably rectangular in cross-section so as to offer greater resistance to deflection in the plane of its greater dimension. This configuration also has the advantage of greater convenience in the handling characteristic of the tape and enables the operator to grasp it and to twist it or manipulate the tape more readily than would otherwise be the case.

While the particular fish tape herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In a fishing tape assembly for use by electricians in installing electrical conductors in protective tubing, said tape being of the type having a main body of highly resilient tempered wire highly resistant to permanent deformation and bending and capable of transmitting both compressive and tension loads acting axially thereof and commonly applied in conductor fishing operations, that improvement which comprises: a relatively short high-strength, resilient, flexible leader projecting axially from the forward end of said tape and having a cross-section substantially that of the main body of said tape, said leader having a core of compactly twisted fine highly-resilient wires contactingly embraced by a helically wound wide thin strip of flexible material, and means on the forward end of said fishing tape assembly for use in quickly attaching and detaching conductors to said assembly while the latter are being installed within said protective tubing.

2. A fishing tape assembly as defined in claim 1 characterized in that the convolutions of said wide thin strip about said flexible leader are closely spaced from one another and extend for substantially the full length of said leader.

3. A fishing tape assembly as defined in claim 1 characterized in that said means for quickly attaching a conductor thereto comprises a loop formed at one end of said leader from the twisted core wires thereof.

4. A fishing tape assembly as defined in claim 1 characterized in the provision of tubular sleeve coupling means surrounding the adjacent ends of said leader and of said fishing tape and positively interconnecting the same.

5. A fishing tape assembly as defined in claim 4 characterized in the provision of means fixedly interconnecting the opposite ends of said coupling means to the adjacent ends of said leader and of said fishing tape.

6. A fishing tape assembly as defined in claim 2 characterized in that the thickness of said helically wound thin strip of flexible material snugly embracing said core wires is not in excess of 8 mils and in that the same is wound about said core wires oppositely to the twist of said core wires.

References Cited in the file of this patent

UNITED STATES PATENTS

| | | |
|---|---|---|
| 1,802,657 | Kellems | Apr. 28, 1931 |
| 2,244,735 | Silverman | June 10, 1941 |
| 2,509,115 | Wait et al. | May 23, 1950 |
| 2,612,546 | Romsos | Sept. 30, 1952 |

FOREIGN PATENTS

| | | |
|---|---|---|
| 304,515 | Switzerland | Mar. 16, 1955 |